United States Patent
Song et al.

(10) Patent No.: US 11,949,438 B2
(45) Date of Patent: Apr. 2, 2024

(54) MULTI-BAND ANTENNA FOR USE WITH LIMITED SIZE GROUND PLANES

(71) Applicant: TAOGLAS GROUP HOLDINGS LIMITED, Enniscorthy (IE)

(72) Inventors: Jinsong Song, Dublin (IE); Baha Badran, Fleet (GB); Neil Woodhouse, Kilcavan Lower (IE)

(73) Assignee: Taoglas Group Holdings Limited, Enniscorthy (IE)

( * ) Notice: Subject to any disclaimer, the term of this patent is extended or adjusted under 35 U.S.C. 154(b) by 49 days.

(21) Appl. No.: 17/684,718

(22) Filed: Mar. 2, 2022

(65) Prior Publication Data

US 2022/0286148 A1 Sep. 8, 2022

Related U.S. Application Data

(60) Provisional application No. 63/155,987, filed on Mar. 3, 2021.

(51) Int. Cl.
| | |
|---|---|
| *H04B 1/00* | (2006.01) |
| *H01Q 1/52* | (2006.01) |
| *H01Q 5/392* | (2015.01) |
| *H01Q 9/30* | (2006.01) |
| *H01Q 9/40* | (2006.01) |

(52) U.S. Cl.
CPC ............ *H04B 1/006* (2013.01); *H01Q 1/52* (2013.01); *H01Q 5/392* (2015.01); *H01Q 9/30* (2013.01); *H01Q 9/40* (2013.01)

(58) Field of Classification Search
CPC .......... H04B 1/006; H01Q 5/392; H01Q 9/30; H01Q 1/52; H01Q 9/40
See application file for complete search history.

(56) References Cited

U.S. PATENT DOCUMENTS

| | | | |
|---|---|---|---|
| 2017/0352945 A1* | 12/2017 | Chang | .................. H01Q 1/36 |
| 2020/0161769 A1 | 5/2020 | Hu et al. | |
| 2023/0028988 A1* | 1/2023 | Li | ........................ H01Q 5/371 |

FOREIGN PATENT DOCUMENTS

| | | | | |
|---|---|---|---|---|
| EP | 1361623 A1 * | 11/2003 | ............. | H01Q 1/243 |
| GB | 2561445 | 10/2018 | | |
| WO | WO-2022142804 A1 * | 7/2022 | ............... | H01Q 1/36 |

\* cited by examiner

*Primary Examiner* — Ab Salam Alkassim, Jr.
*Assistant Examiner* — Leah Rosenberg
(74) *Attorney, Agent, or Firm* — Garson & Gutierrez, PC (57) ABSTRACT

Multi-band antenna for use with limited size ground planes. In one embodiment, the multi-band antenna includes a substrate having a first radiator branch and a second radiator branch; a first switch that is connected with the first radiator branch and a radio module; and a second switch that is connected with the second radiator branch and matching circuitry. Selection between different states of the first switch and the second switch enable the multi-band antenna to operate in a plurality of operating bands. These operating bands may include both the high and low frequency bands for a long-term evolution (LTE) communication device as well as a global navigation satellite system (GNSS) frequency band. Methods of operating the multi-band antenna as well as systems that incorporate the multi-band antenna are also disclosed.

13 Claims, 6 Drawing Sheets

MULTI-BAND ANTENNA FOR USE WITH LIMITED SIZE GROUND PLANES

PRIORITY

This application claims the benefit of priority to U.S. Provisional Patent Application Ser. No. 63/155,987 filed Mar. 3, 2021, of the same title, the contents of which being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

1. Technological Field

The present disclosure relates generally to multi-band antennas, and more particularly in one exemplary aspect to multi-band antennas for use with limited size ground planes.

2. Field of the Disclosure

Ongoing trends in the development of mobile telecommunications devices have resulted in increases in disparity between competing design constraints. For example, mobile telecommunications devices are now often required to be small and compact in design to achieve desired aesthetic-related goals, while also being capable of operating in an increasing number of communication protocols and/or frequency bands. Additionally, to accommodate multiple cellular bands (e.g., frequency ranges between 698-960 and 1710-2700 MHz), the underlying device requires: (1) a relatively large/long ground plane; and/or (2) a tunable antenna design. Additionally, some devices are also required to support frequency bands outside of these traditional cellular bands including, for example, global navigation satellite system (GNSS) frequency bands (e.g., frequency ranges between 1559-1602 MHz) without increasing the size of the underlying printed circuit board (PCB) upon which these antenna devices are deployed.

SUMMARY

The present disclosure satisfies the foregoing needs by providing, inter alia, methods, apparatus and systems for the implementation of multi-band antennas for use with limited size ground planes.

In one aspect, a system that includes a multi-band antenna is disclosed. In one embodiment, the multi-band antenna system includes a multi-band antenna disposed on a substrate, the substrate having a first radiator branch and a second radiator branch; a first switch that is connected with the first radiator branch and a radio module; and a second switch that is connected with the second radiator branch and matching circuitry. Selection between different states for the first switch and the second switch enable the multi-band antenna to operate in a plurality of operating bands.

In one variant, the first radiator branch and the second radiator branch are galvanically isolated from one another.

In another variant, the first radiator branch includes a monopole radiator structure and the second radiator branch includes a U-shaped radiator structure.

In yet another variant, the monopole radiator structure and the U-shaped radiator structure are separated from one another by a gap on either side of the monopole radiator structure.

In yet another variant, the gap on either side of the monopole radiator structure is located at ends of the U-shaped radiator structure.

In yet another variant, the system further includes matching circuitry that is electrically connected with the second switch that is connected with the second radiator branch and the second switch may be switched between different components for the matching circuitry.

In yet another variant, the matching circuitry alters the effective electrical length of the second radiator branch.

In yet another variant, the substrate has a rectangular shape that includes two long sides and two short sides with the U-shaped radiator structure running along one of the short sides and over a majority portion of the two long sides.

In yet another variant, the monopole radiator structure and the U-shaped radiator structure are separated from one another by a gap on either side of the monopole radiator structure.

In yet another variant, the gap on either side of the monopole radiator structure is located at ends of the U-shaped radiator structure.

In yet another variant, the system includes matching circuitry that is electrically connected with the second switch that is connected with the U-shaped radiator structure and the second switch may be switched between different components for the matching circuitry.

In yet another variant, the matching circuitry alters the effective electrical length of the U-shaped radiator structure.

In yet another variant, the first switch enables the monopole radiator structure to switch between different operating frequency bands for the monopole radiator structure.

In yet another variant, the monopole radiator structure includes a rectangular structure that is coupled with an angled structure, the rectangular structure projecting from another one of the short sides and being positioned about a mid-line of the rectangular shape of the substrate and the angled structure projects from one of the long sides of the substrate towards the rectangular structure of the monopole radiator structure.

In yet another variant, the rectangular structure of the monopole radiator structure and the U-shaped radiator structure are separated from one another by a gap on either side of the rectangular structure of the monopole radiator structure.

In yet another variant, the gap on either side of the monopole radiator structure is located at ends of the U-shaped radiator structure.

In another aspect, a multi-band antenna is disclosed. In one embodiment, the multi-band antenna includes a substrate having a first radiator branch and a second radiator branch, the first radiator branch and the second radiator branch being galvanically isolated from one another; a first coupling point for connection with the first radiator branch; and a second coupling point for connection with the second radiator branch.

In one variant, the first radiator branch includes a monopole radiator structure and the second radiator branch includes a U-shaped radiator structure.

In another variant, the monopole radiator structure and the U-shaped radiator structure are separated from one another by a gap on either side of the monopole radiator structure.

In yet another variant, the gap on either side of the monopole radiator structure is located at ends of the U-shaped radiator structure.

In yet another aspect, methods of manufacturing the aforementioned multi-band antenna are disclosed.

In yet another aspect, methods of manufacturing the aforementioned system are disclosed.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

The features, objectives, and advantages of the present disclosure will become more apparent from the detailed description set forth below when taken in conjunction with the drawings, wherein.

All Figures disclosed herein are © Copyright 2021-22 Taoglas Group Holdings Limited. All rights reserved.

DETAILED DESCRIPTION

Exemplary Embodiments

Detailed descriptions of the various embodiments and variants of the apparatus and methods of the present disclosure are now provided. It is noted that wherever practicable similar or like reference numbers may be used in the figures and may indicate similar or like functionality. The figures depict embodiments of systems, multi-band antennas, or methods for purposes of illustration only. One skilled in the art will readily recognize from the following description that alternative embodiments of the structures and methods illustrated herein may be employed without necessarily departing from the principles described herein.

Exemplary Multi-Band Antenna—

Figure 1:
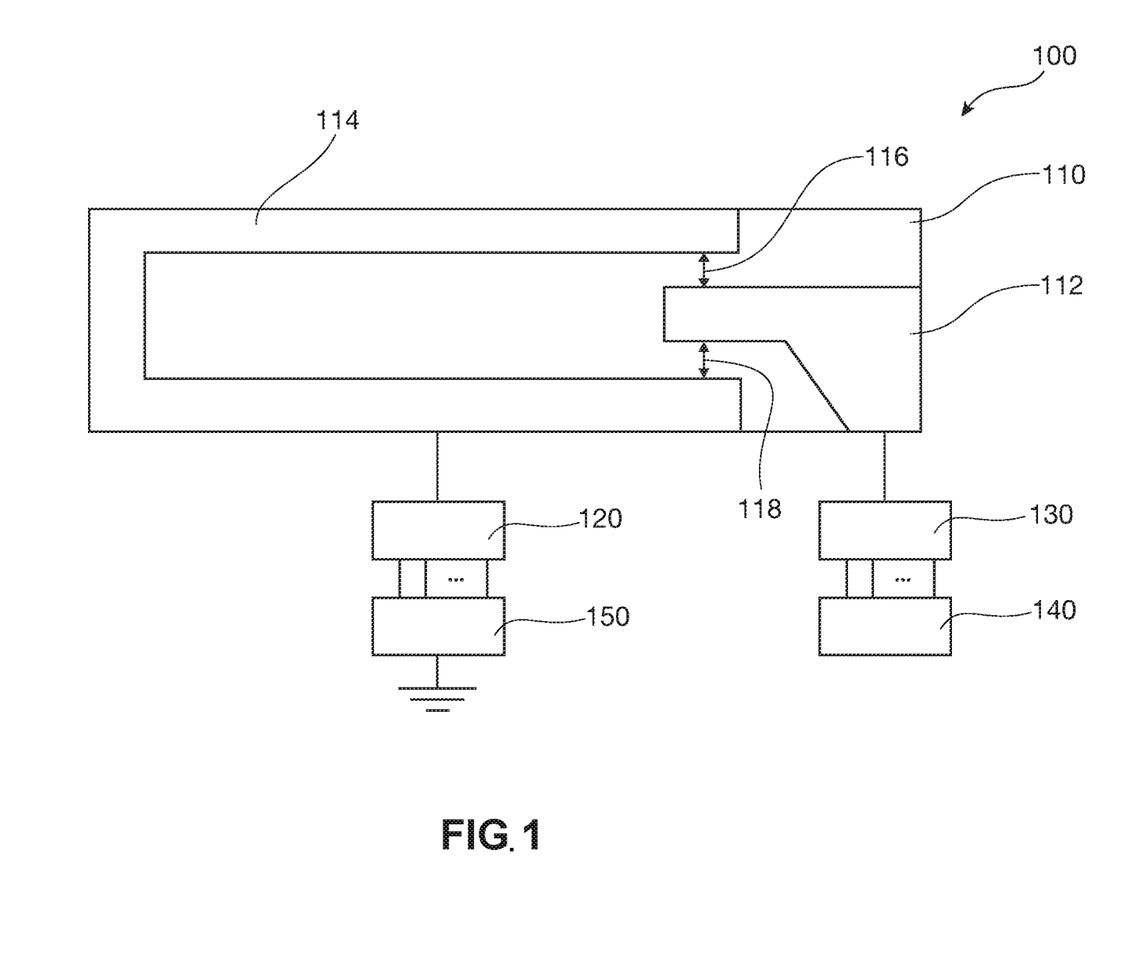
FIG. 1 is a top plan view of a multi-band antenna system for use with limited size ground planes, in accordance with the principles of the present disclosure.

FIG. 1 illustrates an exemplary multi-band antenna 100 for use with limited size ground planes (e.g., 50 mm×50 mm), although it would be appreciated that the underlying antenna design illustrated in FIG. 1 may be implemented in applications where ground plane size is not necessarily a constraint. The multi-band antenna 100 may be constructed on an underlying substrate 110. This substrate 110 may include, for example, a glass-reinforced epoxy laminate substrate (e.g., FR-4 substrate) and/or a ceramic-based substrate. As illustrated in FIG. 1, the substrate 110 may include a first branch 112 of conductive material as well as a second branch 114 of conductive material. The first branch 112 is constructed such that it is not galvanically connected with the second branch 114. The first branch may also include a rectangular structure that is coupled with an angled structure so that the outline of the first branch 112 takes on the shape as illustrated in FIG. 1. The first branch 112 of the multi-band antenna 100 may be fed by an underlying radio module 140. In some implementations, the first branch 112 of the multi-band antenna 100 is constructed as a monopole structure although other radiator structures such as an inverted F antenna ("IFA") radiator structure may be implemented in some situations. The first branch 112 and the second branch 114 may be separated by a gap 116, 118 that enables electromagnetic coupling between the branches 112, 114.

In some implementations, the first branch 112 and the second branch 114 of the multi-band antenna 100 are disposed on the same layer as one another (e.g., on the top layer of the three-dimensional substrate 110). However, in other implementations, the first branch 112 and the second branch 114 of the multi-band antenna 100 may be disposed on different layers. For example, the first branch 112 may be disposed on an inner layer of the substrate 110 (or on the bottom layer of the substrate 110), while the second branch 114 is disposed on another inner layer of the substrate 110 (or on the top layer of the substrate 110). Incorporating the first branch 112 and the second branch 114 in internal layers of the substrate 110 may provide several advantages including, for example, concealing the details of the underlying antenna structure while also providing for increased electrical coupling between the first branch 112 and/or the second branch 114 and other external objects or components that may be positioned near the antenna 100. As but another non-limiting example, the first branch 112 may be disposed on the top layer of the substrate 110, while the second branch 114 may be disposed on the bottom layer of the substrate 110. In yet another non-limiting example, the first branch 112 may reside on a non-parallel plane with the second branch 114. For example, the first branch 112 may reside on a first plane of the substrate 110 (e.g., the top plane of the substrate 110), while the second branch 114 may reside on a plane that is orthogonal with the first plane of the substrate 110 (e.g., on one or more of the side surfaces of the substrate 110, etc.). These and other variants that incorporate the two branches 112, 114 on differing layers of the substrate 110 would be readily appreciated by one of ordinary skill given the contents of the present disclosure.

In some implementations, the length of the substrate may be approximately 38.6 mm while the width of the substrate may be approximately 10.8 mm. In such an implementation, the thickness of the substrate may be approximately 1.6 mm. As used in this context, the term "approximately" refers to variations in manufacturing tolerance that may be dependent upon, for example, the underlying material utilized for the substrate. For example, the manufacturing tolerance for a substrate made from FR-4 material may be larger than the manufacturing tolerance for a substrate made from ceramic. Additionally, the length, width and thickness may vary dependent upon a variety of factors including, without limitation, the intended operating frequency for the multi-band antenna 100 and/or the proximity of the antenna 100 to adjacent ground planes. In some implementations, the thickness of the substrate 110 may be increased to reduce the length and/or width of the substrate 110. Conversely, the thickness of the substrate 110 may be decreased by increasing the length and/or width of the substrate 110. In some variants, the need for a separate substrate 110 may be obviated by, for example, incorporating the multi-band antenna 100 directly onto a substrate of the end user device. Implementations of the multi-band antenna 100 may necessitate a ground clearance area underneath the multi-band antenna 100. However, in some implementations, a ground plane may be incorporated underneath the multi-band antenna 100 by, for example, increasing the thickness of the substrate 110, or by incorporation of stamped metal and/or laser direct sintering (LDS) manufacturing technologies to increase the clearance of the multi-band antenna 100 to ground to achieve a desired performance for the multi-band antenna 100.

In some implementations, a switch 130 is included between the radio module 140 and the first branch 112 of the multi-band antenna 100 so that two or more operating frequency bands may be transmitted and/or received via the first branch 112. For example, the first branch 112 of the multi-band antenna 100 may operate in the high bands of a Long-Term Evolution (LTE) communication protocol (e.g., 1710-2700 MHz) when the switch 130 is in a first state, and further may operate in a GNSS band (e.g., 1559-1602 MHz) when the switch 130 is in a second state. In such a configuration, the switch 130 may consist of a single pole—two throw (SP2T) switch. Additional or alternative operating bands for the first branch 112 of the multi-band antenna 100 may be readily implemented by one of ordinary skill given the contents of the present disclosure via use of, for example, a single pole—four throw (SP4T) switch, a single pole—eight throw (SP8T) switch, or other single pole—multi throw switches. In some implementations, where only a single operating band is needed for the first branch 112, or where the radio module 140 is capable of switching between operating bands, the switch 130 may be obviated altogether.

The second branch 114 of the multi-band antenna 100 operates as a coupling branch for the multi-band antenna 100. In other words, the second branch 114 is not a galvanically fed branch for the multi-band antenna 100; rather the coupling between the first branch 112 and the second branch 114 enables the second branch 114 to resonate at a different frequency band than the first branch 112. For example, in some implementations, the second branch 114 is intended to operate in the lower bands of an LTE communication protocol (e.g., between 698-960 MHz). In such an implementation, the second branch 114 may occupy a larger area and/or have a longer length than the first branch 112. However, in some implementations, the second branch 114 may be intended to operate in higher frequency bands than the first branch. In such an implementation, the second branch 114 may occupy a smaller area and/or have a smaller length than the first branch 112. The second branch 114 may run along the periphery of the underlying substrate 110. For example, the second branch 114 may run along a majority portion of the long sides of the substrate 110 and may also run along one of the short sides of the substrate 110 as shown in FIG. 1.

The second branch 114 may be coupled to matching circuitry 150 via a switch 120 which enables tuning of the second branch 114 to efficiently operate throughout the intended operating band. For example, a first matching circuit 150 may be optimized for operation in a first sub-band (e.g., 698-748 MHz) of the entire operating band (e.g., between 698-960 MHz) of the second branch 114. A second matching circuit 150 may be optimized for operation in a second sub-band (e.g., 746-849 MHz) of the entire operating band of the second branch 114, while a third matching circuit 150 may be optimized for operation in a third sub-band (e.g., 824-960 MHz) of the entire operating band of the second branch 114 and so on and so forth. In some implementations, a fourth matching circuit 150 may enable the second branch 114 to operate in a GNSS frequency band. This switch 120 may include a single pole—multi throw switch (e.g., SP2T, SP4T, or SP8T, etc.). In some variants, an antenna tuner circuit may be used in addition to, or alternatively than, the matching circuits 150 described above. For example, the antenna tuner circuit may include a tunable capacitor that enables the second branch 114 to operate in multiple differing bands. In some implementations, the coupling point between the second branch 114 and the switch 120 and/or matching circuitry 150 may be moved to the right (or the left) from that positioning shown in FIGS. 1, 2A and 2C.

As a brief aside, the matching circuitry 150 alters the effective electrical length and resonance of the second branch 114 through varying impedances. For example, by switching between different circuits that have differing capacitance values, the effective electrical length and resonance of the second branch 114 is altered. More generally, as the capacitance of the matching circuitry increases, the effective electrical length of the second branch 114 increases and the frequency of resonance for the second branch 114 of the multi-band antenna 100 is lowered. Similarly, by switching between different circuits having differing inductance values, the effective electrical length and resonance of the second branch 114 is altered. For example, as the inductance value increases, the effective electrical length of the second branch 114 increases, resulting in a lower resonant frequency for the second branch 114 of the multi-band antenna 100. Combinations of the aforementioned capacitors and inductors (as well as other passive electronic circuitry such as resistors (e.g., 0 ohm resistors)) may be utilized in order to alter the effective electrical length and resonant frequency of the second branch 114 of the multi-band antenna 100.

In some implementations, the switch circuitry 120 for the second branch 114 may be controlled by the radio module 140. For example, the radio module 140 may include a truth table that controls the switch circuitry 120 and hence the sub-bands that are selected to be transmitted and/or received over the second branch 114. By selecting between various sub-bands, as opposed to operating over the full intended frequency band of the second branch 114, the operating efficiency of the multi-band antenna 100 may be increased. Additionally, in implementations with limited-size ground planes, the effective bandwidth for the antenna 100 in the lower operating bands is decreased. Accordingly, by switching between various matching circuits within the matching circuitry 150, the total effective bandwidth for the second branch 114 may be increased as compared with an implementation that is not able to switch between various matching circuits (i.e., has a fixed effective electrical length for the second branch 114). In alternative variants, a micro controller may be used in addition to, or alternatively than, the aforementioned radio module 140. In other words, a micro controller may be utilized which controls the switch circuitry 120 and hence the sub-bands that are selected to be transmitted and/or received over the second branch 114.

Figure 2A:
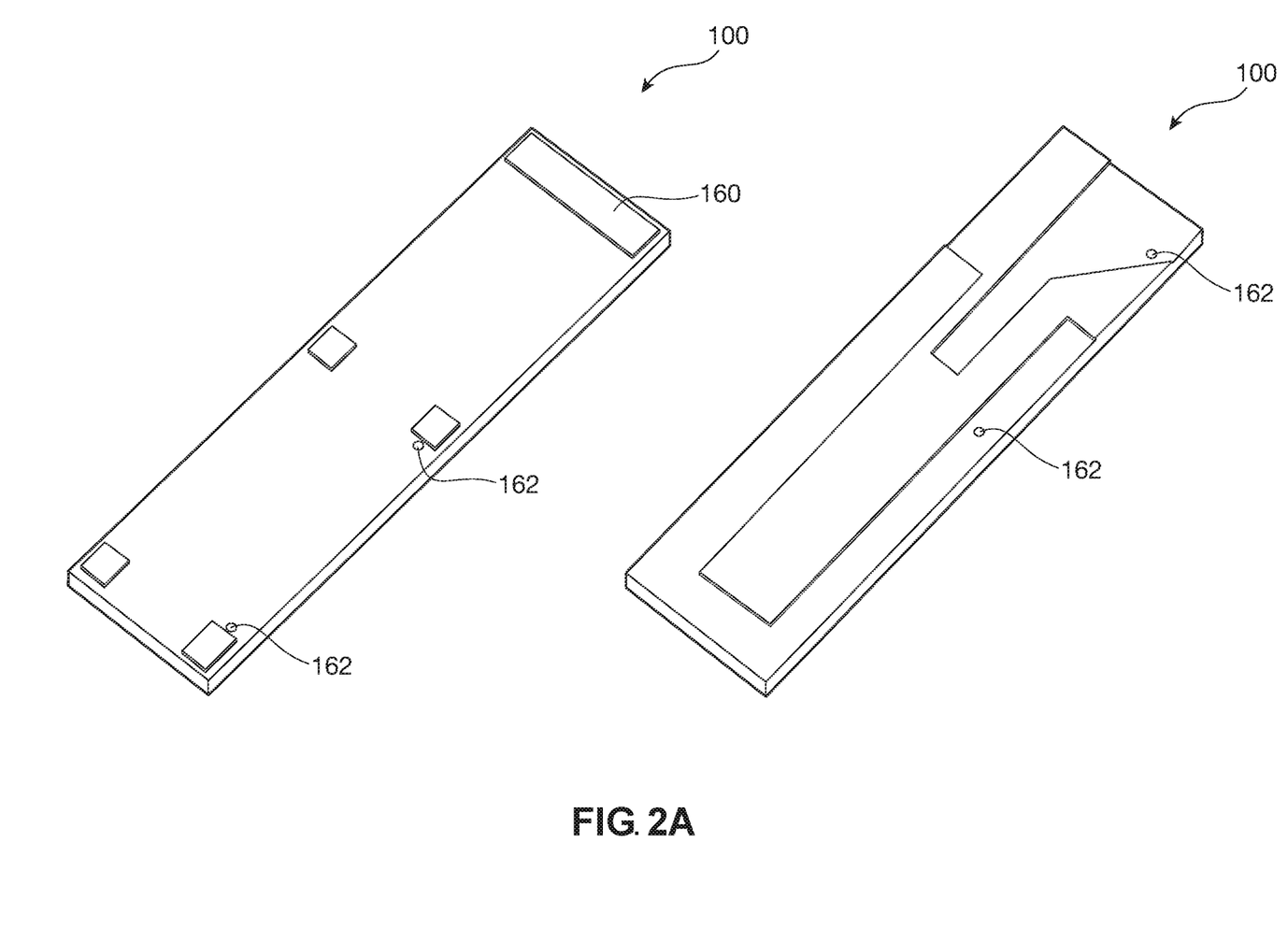
FIG. 2A is a top and bottom perspective view of the multi-band antenna of FIG. 1, in accordance with the principles of the present disclosure.
Figure 2B:
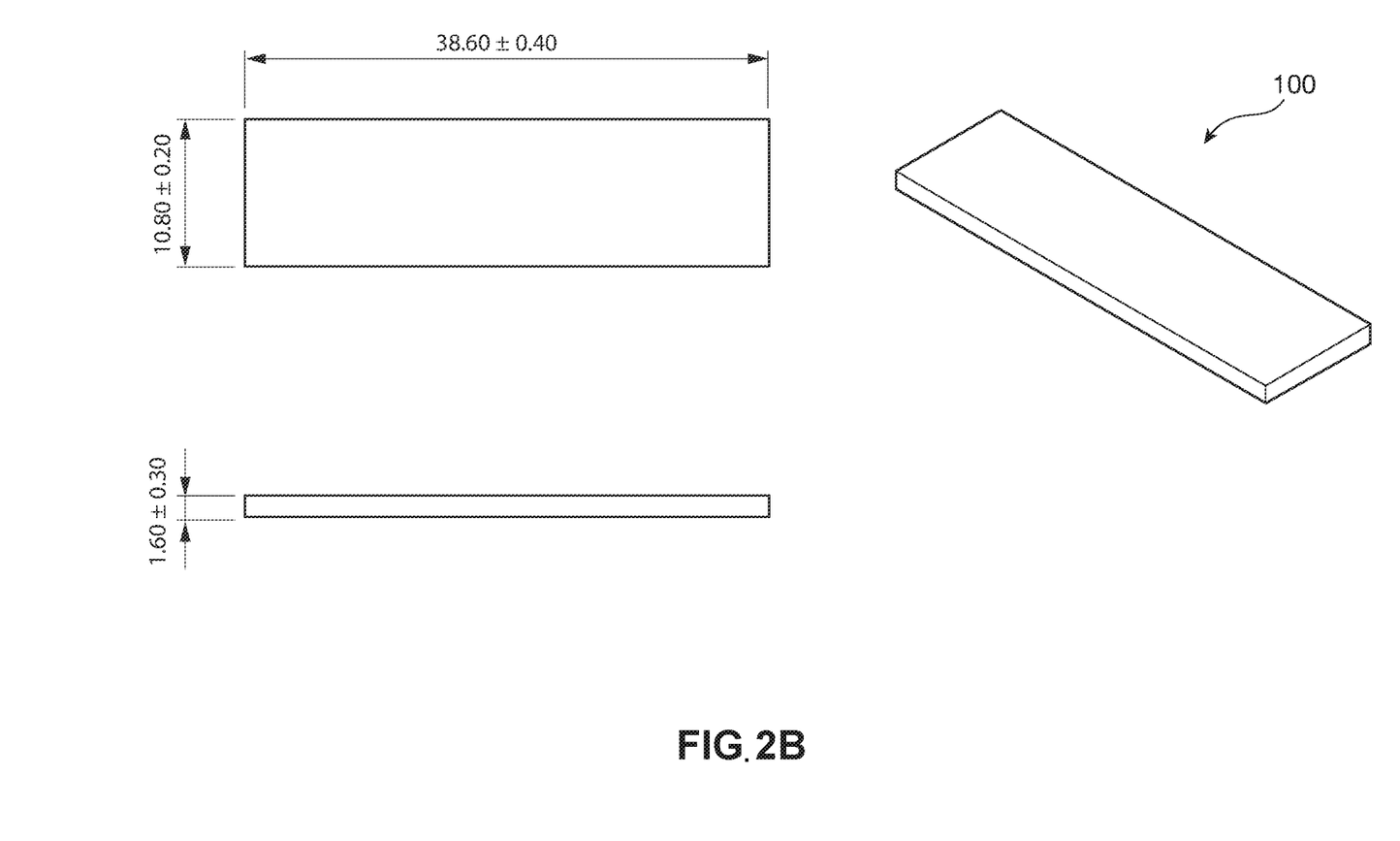
FIG. 2B is a top, front and perspective view of the multi-band antenna of FIG. 1, in accordance with the principles of the present disclosure.
Figure 2C:
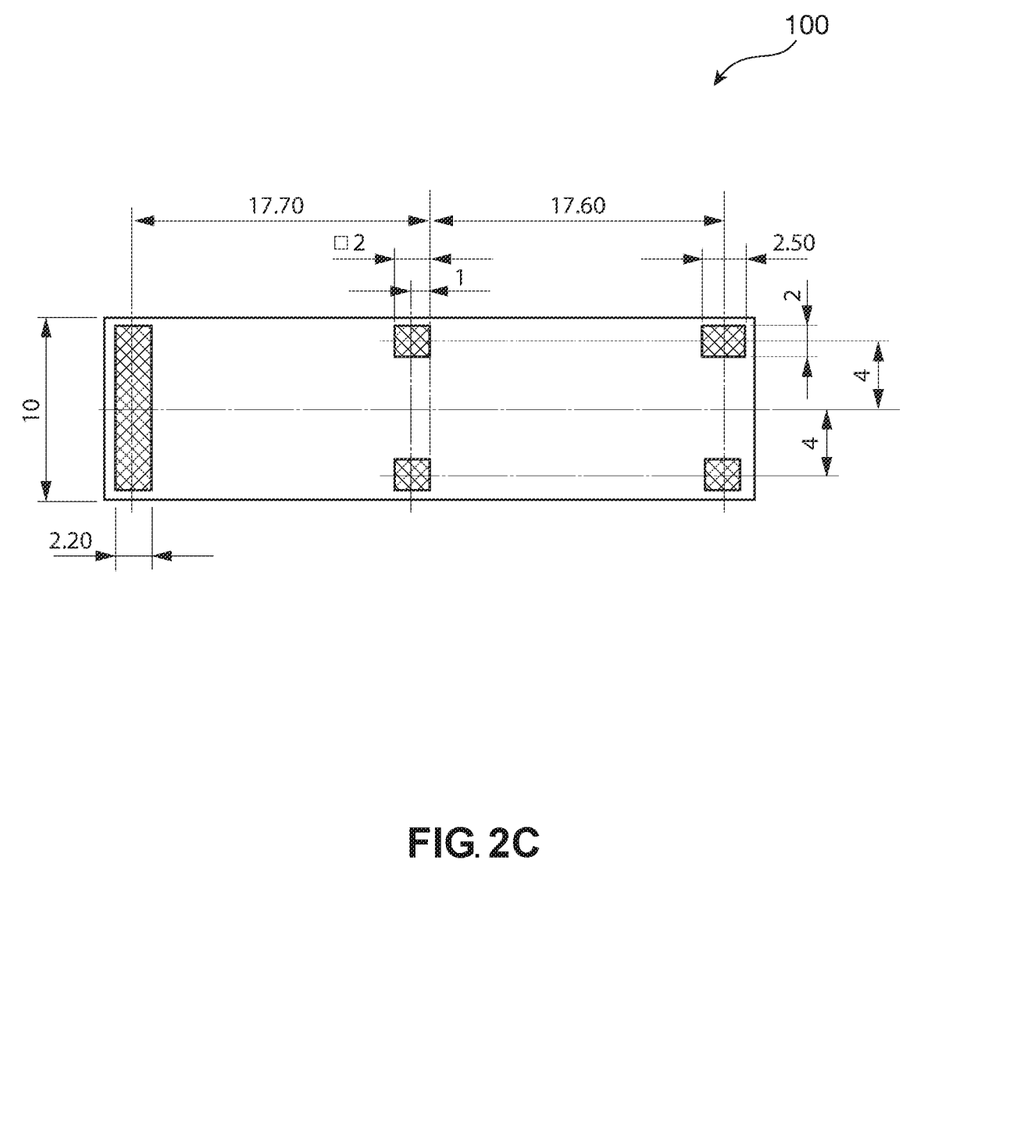
FIG. 2C is a bottom plan view of the multi-band antenna of FIG. 1, in accordance with the principles of the present disclosure.

Referring now to FIG. 2A, a bottom perspective view as well as a top perspective view of the multi-band antenna 100 is shown and described in detail. As can be seen in the bottom perspective view, the multi-band antenna 100 is shown with five (5) distinct solder pads 160. These solder pads enable the multi-band antenna to be attached to an external printed circuit board ("PCB") using surface mount technology. As illustrated, two of these solder pads 160 also has a through hole via 162 associated therewith. These through hole vias 162 enable the bottom side of the multi-band antenna to electrically communicate with the first branch 112 and the second branch 114 disposed on the opposing side of the multi-band antenna 100. In some implementations, and as illustrated in FIG. 2A, the top surface of the multi-band antenna 100 may be covered with, for example, a dielectric material. The top surface of the multi-band antenna 100 may also be relatively non-planar such that the portions of the top surface associated with the first and second branches 112, 114 may reside below the other portions of the top surface of the multi-band antenna 100. In some variants, these non-planar surfaces may be reversed such that the portions associated with the first and second branches 112, 114 may reside above the other portions of the top surface of the multi-band antenna 100. In yet other variants, the top surface of the multi-band antenna 100 may include a planar surface across each of the portions of the multi-band antenna 100 as shown in, for example, the isometric view illustrated in FIG. 2B. Referring now to FIG. 2C, an exemplary solder pad layout for the multi-band antenna 100 is illustrated. In the implementation illustrated, solder pads 2, 3 and 4 may all be identical in size and square in shape having a dimension of 2 mm by 2 mm. Solder pad 1 may be slightly larger than solder pads 2, 3 and 4 having a rectangular shape of 2.5 mm by 2 mm. Solder pad 5 may also be rectangular in dimension as well having a dimension of 10 mm by 2.2 mm.

While primarily described in the context of implementation of the multi-band antenna 100 into mobile telecommunications devices, it would be appreciated that the features of the multi-band antenna 100 has broader usefulness beyond this specific implementation example. For example, the principles of the multi-band antenna 100 design described herein may be particularly useful in other devices with a limited size ground plane. One such non-limiting example may be incorporation of the multi-band antenna 100 into Internet of Things (IoT) devices that may have, for example, 5G, 4G and/or GNSS connectivity. These and other variants would be readily apparent to one of ordinary skill given the contents of the present disclosure.

Exemplary Multi-Band Antenna Performance—

Figure 3:
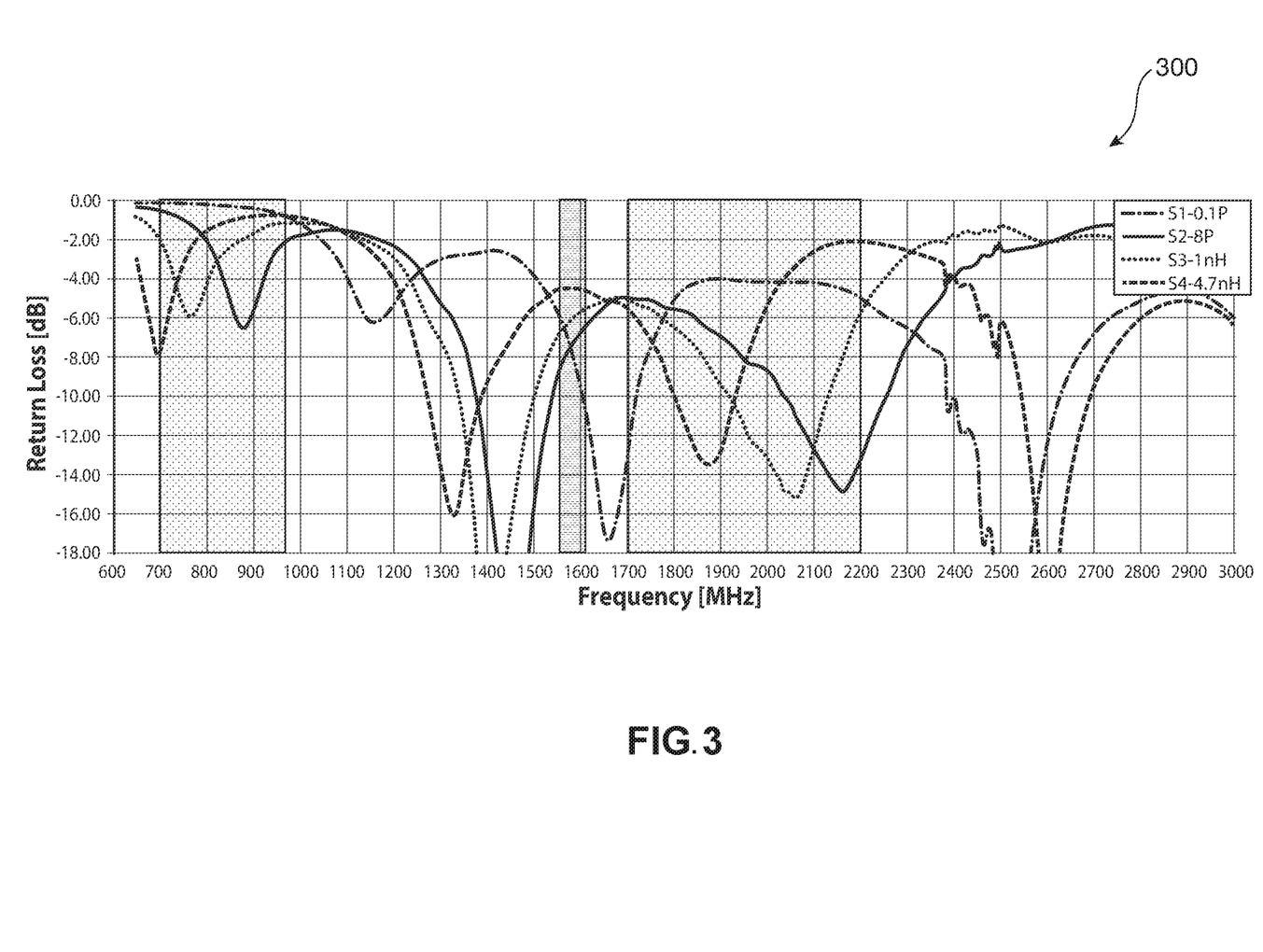
FIG. 3 is a plot of return loss as a function of frequency for an embodiment of the multi-band antenna of FIG. 1, in accordance with the principles of the present disclosure.

Referring now to FIG. 3, a plot 300 of return loss as a function of frequency is shown and described in detail. In this example, a multi-band antenna 100 is implemented that is of similar structure as that set forth in FIG. 1 described supra. The multi-band antenna 100 has a substrate length of approximately 38.6 mm and a substrate width of approximately 10.8 mm. The thickness of the substrate is approximately 1.6 mm. The switch 120 coupled to the second branch 114 of the multi-band antenna 100 is a SP4T switch. The matching circuitry 150 has four distinct matching circuits including: (1) a first state having an impedance value of 0.1 pF; (2) a second state having an impedance value of 8 pF; (3) a third state having an impedance value of 1 nH; and (4) a fourth state having an impedance value of 4.7 nH. As can be seen in the plot 200 illustrated in FIG. 2, the operating characteristics of the multi-band antenna 100 varies as the switch 120 selects between individual ones of the distinct matching circuits.

Figure 4:
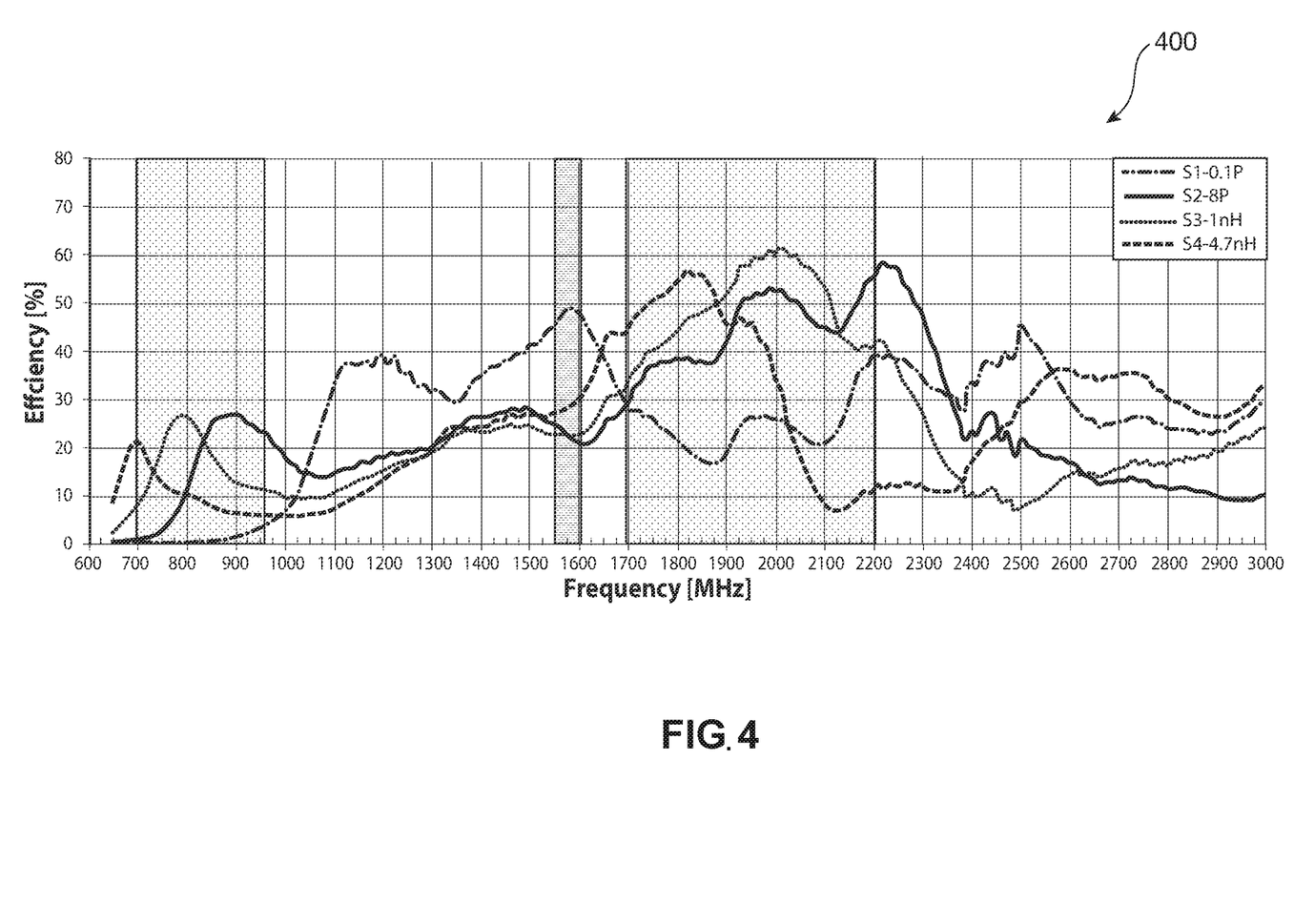
FIG. 4 is a plot of antenna efficiency as a function of frequency for an embodiment of the multi-band antenna of FIG. 1, in accordance with the principles of the present disclosure.

Referring now to FIG. 4, a plot 400 of antenna efficiency as a function of frequency is shown and described in detail. As shown in FIG. 4, the multi-band antenna 100 has an average efficiency of approximately 18% in the operating band between 698-748 MHz; an average efficiency of approximately 20% in the operating band between 746-803 MHz; an average efficiency of approximately 23% in the operating band between 791-849 MHz; an average efficiency of approximately 22% in the operating band between 824-894 MHz; an average efficiency of approximately 24% in the operating band between 880-960 MHz; an average efficiency of approximately 48% in the operating band around 1575 MHz; and an average efficiency of approximately 50% in the operating band between 1710-2220 MHz. These efficiency values are achieved through use of a SP4T switch 120 having the impedance values for the matching circuitry 150 as set forth in FIG. 2 above.

Additionally, in the lower operating band of the antenna 100 (i.e., between 698 MHz and 960 MHz), the effective bandwidth for the antenna 100 has been increased through use of the SP4T switch 120. For example, if the antenna only included a 4.7 nH matching circuit, the efficiency of the antenna 100 would significantly degrade as the operating frequency approached 960 MHz. Additionally, if the antenna 100 only included a 1 nH matching circuit, the efficiency of the antenna 100 would significantly degrade as the operating frequency approached 698 MHz or approached 960 MHz, while having a peak efficiency near 800 MHz. Finally, if the antenna only included a 8 pF matching circuit, the efficiency of the antenna 100 would significantly degrade as the operating frequency approached 698 MHz. However, by including a switch 120 that can select between these aforementioned matching circuits, the antenna efficiency in the lower operating band can be maintained at acceptable levels throughout the operating band between 698 MHz and 960 MHz.

It will be recognized that while certain aspects of the present disclosure are described in terms of specific design examples, these descriptions are only illustrative of the broader methods of the disclosure and may be modified as required by the particular design. Certain steps may be rendered unnecessary or optional under certain circumstances. Additionally, certain steps or functionality may be added to the disclosed embodiments, or the order of performance of two or more steps permuted. All such variations are considered to be encompassed within the present disclosure described and claimed herein.

While the above detailed description has shown, described, and pointed out novel features of the present disclosure as applied to various embodiments, it will be understood that various omissions, substitutions, and changes in the form and details of the device or process illustrated may be made by those skilled in the art without departing from the principles of the present disclosure. The foregoing description is of the best mode presently contemplated of carrying out the present disclosure. This description is in no way meant to be limiting, but rather should be taken as illustrative of the general principles of the present disclosure. The scope of the present disclosure should be determined with reference to the claims.

What is claimed is:

1. A multi-band antenna system, comprising:
   a multi-band antenna comprising a substrate, the substrate comprising a first radiator branch and a second radiator branch;
   a first switch that is connected with the first radiator branch and a radio module; and
   a second switch that is connected with the second radiator branch and matching circuitry;
   wherein selection between different states for the first switch and the second switch enable the multi-band antenna to operate in a plurality of operating bands;

wherein the first radiator branch and the second radiator branch are galvanically isolated from one another;

wherein the first radiator branch comprises a monopole radiator structure and the second radiator branch comprises a U-shaped radiator structure; and wherein the monopole radiator structure and the U-shaped radiator structure are separated from one another by a gap on either side of the monopole radiator structure.

2. The multi-band antenna system of claim 1, wherein the gap on either side of the monopole radiator structure is located at ends of the U-shaped radiator structure.

3. The multi-band antenna system of claim 2, further comprising matching circuitry that is electrically connected with the second switch that is connected with the second radiator branch and wherein the second switch may be switched between different components for the matching circuitry.

4. The multi-band antenna system of claim 3, wherein the matching circuitry alters the effective electrical length of the second radiator branch.

5. The multi-band antenna system of claim 4, wherein the substrate comprises a rectangular shape comprising two long sides and two short sides;

wherein the U-shaped radiator structure runs along one of the short sides and over a majority portion of the two long sides.

6. The multi-band antenna system of claim 5, wherein the monopole radiator structure and the U-shaped radiator structure are separated from one another by a gap on either side of the monopole radiator structure.

7. The multi-band antenna system of claim 6, wherein the gap on either side of the monopole radiator structure is located at ends of the U-shaped radiator structure.

8. The multi-band antenna system of claim 7, further comprising matching circuitry that is electrically connected with the second switch that is connected with the U-shaped radiator structure and wherein the second switch may be switched between different components for the matching circuitry.

9. The multi-band antenna system of claim 8, wherein the matching circuitry alters the effective electrical length of the U-shaped radiator structure.

10. The multi-band antenna system of claim 9, wherein the first switch enables the monopole radiator structure to switch between different operating frequency bands for the monopole radiator structure.

11. The multi-band antenna system of claim 5, wherein the monopole radiator structure comprises a rectangular structure that is coupled with an angled structure, the rectangular structure projecting from another one of the short sides and being positioned about a mid-line of the rectangular shape of the substrate; and the angled structure projects from one of the long sides of the substrate towards the rectangular structure of the monopole radiator structure.

12. The multi-band antenna system of claim 11, wherein the rectangular structure of the monopole radiator structure and the U-shaped radiator structure are separated from one another by a gap on either side of the rectangular structure of the monopole radiator structure.

13. The multi-band antenna system of claim 12, wherein the gap on either side of the monopole radiator structure is located at ends of the U-shaped radiator structure.

* * * * *